Aug. 29, 1933.    G. M. BELLANCA    1,924,481
LANDING GEAR ASSEMBLY
Filed Feb. 5, 1932
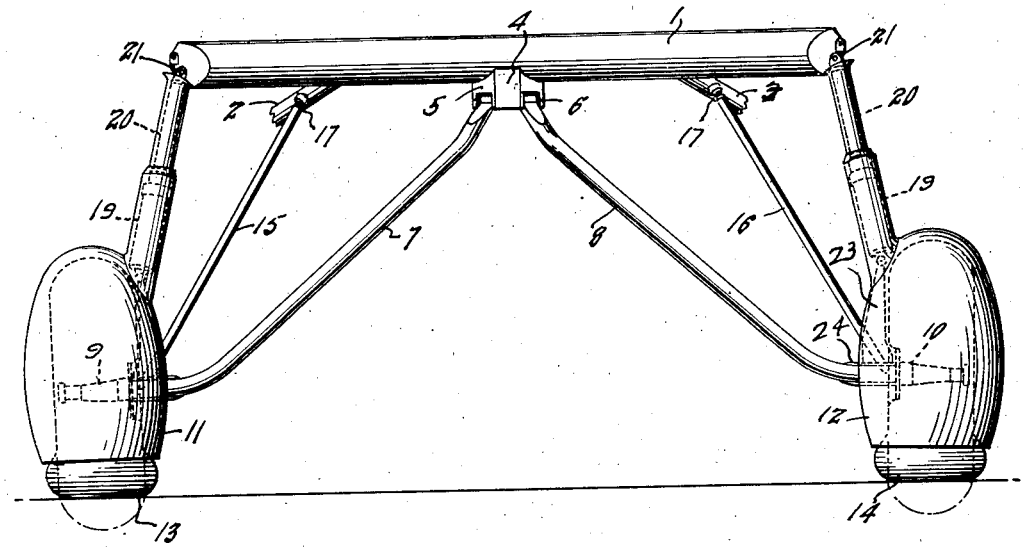
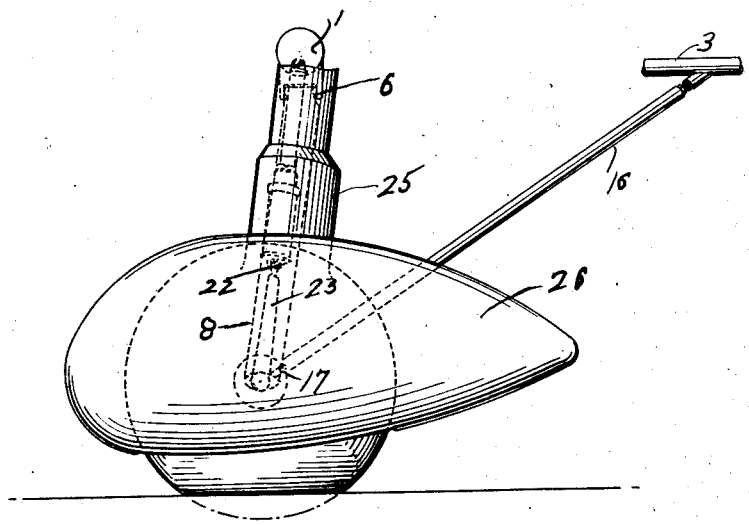
Inventor
GIUSEPPE M. BELLANCA
By Semmes & Semmes
Attorneys Patented Aug. 29, 1933

1,924,481

UNITED STATES PATENT OFFICE 1,924,481

LANDING GEAR ASSEMBLY

Giuseppe M. Bellanca, New Castle, Del.

Application February 5, 1932. Serial No. 591,145

3 Claims. (Cl. 244—2)

This invention relates to an improvement in airplanes and more particularly to an improved landing gear.

A major object of the invention is to provide a novel type of landing gear in which the landing stresses are distributed over a relatively wide area of longeron structure.

Another object is to provide an improved landing gear in which the landing wheels are mounted upon members which are attached to the fuselage substantially upon the longitudinal center.

A further object is to provide an improved landing gear structure which combines optimum rigidity of structure with minimum parasitic resistance.

With these and other equally important objects in view the invention comprehends the concept of mounting the landing wheels upon relatively rugged members which extend from the longitudinal axis of the plane, at the fuselage, down to the point of mounting of the wheel. This type of structure tends to combine the advantage of the lateral rigidity of the continuous axle type of landing wheel with the other advantages of the split axle type. Suitably associated with the landing wheel is an oleo gear structure and strut members, all of which, conjointly, serve to provide an admirably trussed and rigidifying structure.

In order to enable a more ready comprehension of the invention a preferred modification is shown in the accompanying drawing, in which:

Figure 1 is a front elevation of the landing wheel structure; and

Figure 2 is a side view thereof.

As shown in the drawing, the structure may comprise a main beam 1 which extends laterally of the fuselage and is suitably attached to it by means not shown. This member may be of any suitable material, such as hollow chrome molybdenum tubing or other metal of desirable characteristics. Attached to the rear portion of the beam 1 are the strut members 2 and 3 which, if desired, may extend rearwardly to serve also as longeron members. Attached to the bottom portion of the beam 1 is a fitting 4. This is rigidly attached to the beam and is preferably fused to it, as for example by means of a seam weld. This fitting has two bifurcated portions 5 and 6. The lower end of the bifurcations receive the spindles (not shown) upon which are received the tapered ends of the similarly constructed axles 7 and 8. These axles, like the other stress-taking part of the gear, are constructed of chrome molybdenum steel, or other metal of high tensile properties.

At their lower ends the axles 7 and 8 are curved laterally and terminate in the spindle or stub sections 9 and 10 respectively. These fit within the hub of the wheels 11 and 12, which wheels are provided, as shown, with the low pressure tires 13 and 14.

The landing wheels are trussed to the longitudinal axis by means of the struts 15 and 16. These are connected at one end to the longeron members 2 and 3 through a suitable universal joint connection 17 so as to permit relative movement of the landing wheel with respect to the longeron members.

Thrust is imparted from the landing wheel to the main beam 1 through the oleo gear assembly designated generally by the numeral 19. This assemblage comprises an upper tubular member 20 hinged by means of the connection 21 to the main beam. This tubular member extends into the cylinder 22 of the oleo gear. The members 20 and 22, as will be understood, are so mounted as to permit of relative longitudinal or telescopic movement so as to provide the shock absorbing mechanism for the tire. Attached to the lower end of the cylinder 22 of the oleo gear is a member 23 which is also connected at its other end to the elongated fitting 24. The members 23 and 16 are attached to the member 24, which, as will be noted in Figure 1, is mounted upon the rounded and horizontal end of the axle portion 8. It will thus be seen that the three rigidifying or stress-taking members 8, 16 and 23 are connected substantially upon the axis of the ground wheel.

Fitting over the oleo gear structure is a fairing 25. This is joined to a wheel fairing 26 which, as shown, is of maximum stream-lined contour. The wheel fairing 26 substantially completely encloses the wheel and also largely encloses the fitting 24 and the end of the struts 16 and 23.

As will be seen from an inspection of Figure 2, the axle member 8 is of stream-lined cross section so as to reduce head resistance. The operation of this type of structure will have been appreciated from the foregoing description. By reason of the pivotal mounting at 6, 17 and 21 and the telescopic connection comprehended by the oleo gear 20, the wheel 11 may move vertically relatively to the fuselage while at the same time insuring maximum rigidity of structure.

While an improved modification of the invention has been described, it will be understood that this is given largely for explaining the major features of the invention and is to be considered in an illustrative and not restrictive sense.

I claim:

1. An airplane landing gear of the divided axle type comprising an axle beam mounted within the fuselage, an axle bar hinged at one end to the center portion of said beam and extending diagonally downwardly and forwardly and being formed at its lower portion with a substantially horizontal axle section, a landing wheel mounted upon said axle section the said axle section being positioned forwardly of the point where the axle bar is hinged to the axle beam, a substantially vertical strut extending from the axle section to the axle beam, an oleogear included in said vertical strut and a bracing strut having a universal joint included therein extending from the said axle section rearwardly and attached to a structural part in the rear of the axle beam and placed laterally from the longitudinal axis of the fuselage.

2. An airplane landing gear of the divided axle type comprising an axle beam mounted within the fuselage, an axle bar of stream lined form hinged at one end to the center portion of said beam, and extending diagonally downwardly and forwardly and being formed at its lower end into a substantially horizontal axle section, a landing wheel mounted on the axle section, a substantially vertical strut extending from the axle section to the axle beam, an oleo gear included in said vertical strut, a fairing enclosing the vertical strut and the landing wheel, and a bracing strut having a universal joint therein and extending rearwardly from said axle section and being attached at its end to a structural part in the rear of the axle beam and positioned laterally from the longitudinal center of the fuselage.

3. An airplane landing gear of the divided axle type comprising an axle beam mounted within the fuselage, an axle bar of stream lined form hinged at one end to the center portion of said beam and extending diagonally downwardly and forwardly and being formed at its lower end into a substantially horizontal axle section, an axle fitting having an upwardly extending part, an oleo strut pivoted at one end to the axle beam and at the other end to the axle fitting, a fairing enclosing the oleo strut, axle fitting and wheel, and a bracing strut extending from the axle fitting to a longeron of the plane in the rear of the axle beam and to the side of the longitudinal axis of the fuselage.

GIUSEPPE M. BELLANCA.